United States Patent
Ishihara et al.

[11] Patent Number: 6,006,718
[45] Date of Patent: Dec. 28, 1999

[54] CYLINDER DIRECT INJECTION SPARK-IGNITION ENGINE

[75] Inventors: Kouji Ishihara, Yokohama; Hiroshi Miyakubo; Tsuyoshi Taniyama, both of Kanagawa, all of Japan

[73] Assignee: Nissan Motor Co., Ltd., Yokohama, Japan

[21] Appl. No.: 09/122,645

[22] Filed: Jul. 27, 1998

[30] Foreign Application Priority Data

Jul. 31, 1997 [JP] Japan ................ 9-205640

[51] Int. Cl.⁶ .................... F02B 17/00
[52] U.S. Cl. ............ 123/295; 123/301; 123/302; 123/308
[58] Field of Search ............ 123/295, 301, 123/302, 308, 306

[56] References Cited

U.S. PATENT DOCUMENTS

| | | | |
|---|---|---|---|
| 4,827,883 | 5/1989 | Khalighi et al. | 123/306 |
| 4,834,035 | 5/1989 | Shimada et al. | 123/188 M |
| 5,190,008 | 3/1993 | Yamasaki et al. | 123/306 |
| 5,609,132 | 3/1997 | Minowa et al. | 123/306 |
| 5,765,372 | 6/1998 | Mitobe et al. | 123/585 |
| 5,850,816 | 12/1998 | Ohsuga et al. | 123/295 |
| 5,873,344 | 2/1999 | Kudou et al. | 123/295 |
| 5,915,357 | 6/1999 | Harada et al. | 123/295 |

FOREIGN PATENT DOCUMENTS

| | | |
|---|---|---|
| 0 532 020 | 3/1993 | European Pat. Off. . |
| 2-125911 | 5/1990 | Japan . |

OTHER PUBLICATIONS

Patent Abstracts of Japan, vol. 009, No. 162 (M–394), Jul. 6, 1985 (JP 60 036721 A (MAZDA KK) Feb. 25, 1985).

*Primary Examiner*—Erick R. Solis
*Attorney, Agent, or Firm*—Foley & Lardner

[57] ABSTRACT

A cylinder direct injection spark-ignition engine in which fuel is directly injected from a fuel injector into each cylinder. The engine has an intake system having two intake ports for each cylinder. A swirl control valve is movably disposed in a passage connected to one of the intake ports. The swirl control valve functions to regulate the intensity (a swirl ratio) of swirl to be generated in the cylinder. Sensors are provided to detect an engine operating condition representative of a stratified charge combustion region. Additionally, a controller is provided to control the swirl control valve so as to change the swirl ratio in accordance an engine speed of the engine, when the current engine operating condition is detected to correspond to the stratified charge combustion region.

12 Claims, 10 Drawing Sheets

CYLINDER DIRECT INJECTION SPARK-IGNITION ENGINE

The contents of Japanese Patent Application No. 9-205640, with a filing date of Jul. 31, 1997 in Japan, are hereby incorporated by reference.

BACKGROUND OF THE INVENTION

1. Field of the Invention

This invention relates to improvements in a cylinder direct injection spark-ignition internal combustion engine, and more particularly to a control system for variably controlling the intensity of swirl to be generated in a cylinder of the engine.

2. Description of the Prior Art

Hitherto cylinder direct injection spark-ignition internal combustion engines have been proposed and put into practical use, in which fuel is directly injected into each cylinder of the engine. Typical one of them is disclosed in Japanese Patent Provisional Publication No. 2-125911. This engine is configured as follows: Each piston is formed at its crown with a cavity. A spark plug is installed to a cylinder head and located to face the peripheral portion of the cavity. A fuel injector is disposed to project in the cylinder so as to directly inject fuel into the cylinder, and located to prevent injected fuel from directly splashing onto the spark plug.

Additionally, this engine is provided with a device for controlling the intensity of swirl of air-fuel mixture to be generated in the cylinder. In a low engine load operating range, the intensity of swirl is increased by the swirl intensity controlling device, while fuel is injected from the fuel injector at the latter half of compression stroke, thereby gathering combustible mixture around the spark plug. The combustible mixture is burnt to accomplish stratified charge combustion in the cylinder. In a high engine load operating range, the intensity of swirl is decreased, while fuel is injected on intake stroke thereby to previously mix fuel and air. This forms homogeneous air-fuel mixture throughout the whole combustion chamber thus to accomplishing homogeneous charge combustion in the cylinder.

SUMMARY OF THE INVENTION

It has been recognized that if the intensity of swirl is changed in a stratified charge combustion region where stratified charge combustion is made, combustion condition in the cylinder is changed thereby affecting driveablity of the engine. In view of this, the intensity of swirl is required to be gradually changed to omit a changeover shock to be generated when the combustion condition is changed.

However, with the above-discussed conventional engine, the intensity of swirl is changed in accordance with engine load which is largely changed stepwise, for example, when acceleration and deceleration are abruptly repeated in the stratified charge combustion region. Accordingly, change in swirl (i.e., change in combustion condition) becomes abrupt thereby degrading driveability of the engine. Otherwise, if only the intensity of swirl is gradually changed during sudden acceleration or deceleration in the stratified charge combustion region, there arises the fear that no matching is established between the magnitude of engine load and the magnitude of the swirl intensity.

Here, assume that engine operation is divided into the stratified charge combustion region and a homogeneous charge combustion region where homogeneous charge combustion is made, in which the homogeneous charge combustion region is further divided into a lean homogeneous charge combustion region and a stoichiometric homogeneous charge combustion region (including a high power output homogeneous charge combustion region). In a process that engine operation is changed over from the stratified change combustion region through the lean homogeneous charge combustion region to the stoichiometric homogeneous charge combustion region, it is required that the intensity of swirl is gradually decreased in the stratified charge combustion condition, immediately decreased in the lean homogeneous charge combustion region, and again decreased immediately after reaching the stoichiometric homogeneous charge combustion region. As a result, the intensity of swirl in the cylinder is unavoidably changed largely whenever combustion condition in the cylinder is changed over. Even if the intensity of swirl is changed in accordance with engine load in a process that engine operation is changed from the stratified charge combustion region through the lean homogeneous charge combustion region to the stoichiometric homogeneous charge combustion region under a change in engine load, change in swirl intensity becomes abrupt thereby degrading driveability of the engine.

In view of the above, it is an object of the present invention to provide an improved cylinder direct injection spark-ignition internal combustion engine, which can effectively overcome drawbacks encountered in conventional direct injection spark-ignition internal combustion engines.

Another object of the present invention is to provide an improved cylinder direct injection spark-ignition internal combustion engine, in which combustion condition in each cylinder cannot be abruptly changed even under abrupt acceleration and deceleration of the engine.

A further object of the present invention is to provide an improved cylinder direct injection spark-ignition internal combustion engine, in which the intensity of swirl to be generated in each cylinder is variably controlled in accordance with engine speed which does not make its abrupt change.

Figure 16:
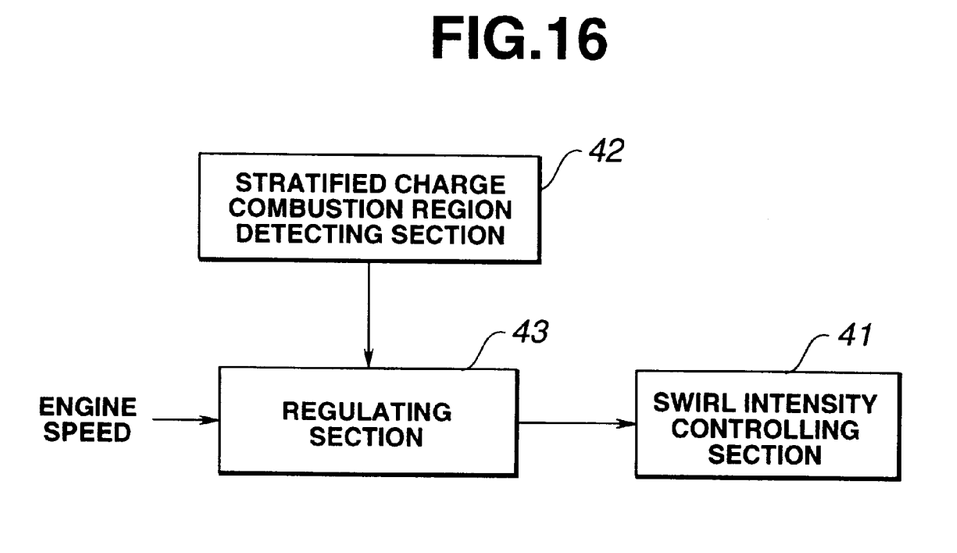
FIG. 16 is a block diagram illustrating the principle of the present invention.

An aspect of the present invention resides, as shown in FIG. 16, in a cylinder direct injection spark-ignition internal combustion engine which comprises a section 41 for controlling an intensity of swirl to be formed in a cylinder of the engine. A section 42 is provided to detect a stratified charge combustion region in accordance with an engine operating condition. Additionally, a section 43 is provided to regulate the swirl intensity controlling section so as to change the intensity of swirl in accordance with an engine speed of the engine, in the stratified charge combustion region detected by the detecting section.

Another aspect of the present invention resides in a cylinder direct injection spark-ignition internal combustion engine which comprises a swirl control valve movably disposed in a passage connected to a cylinder of the engine, the swirl control valve regulating a swirl ratio in the cylinder. A sensor is provided to detect an engine operating condition representative of a stratified charge combustion region. Additionally, a controller is provided to control the swirl control valve so as to change the swirl ratio in accordance an engine speed of the engine, in the stratified charge combustion region detected by the sensor.

According to the present invention, in the stratified charge combustion region, the intensity of swirl is changed in accordance with engine speed which hardly makes its abrupt change, without being changed in accordance with engine load which may its abrupt change. As a result, if abrupt acceleration and deceleration of the engine are made in the stratified charge combustion region, combustion condition in a cylinder cannot change abruptly thereby reducing influence onto driveability of the engine.

DETAILED DESCRIPTION OF THE INVENTION

Figure 1:
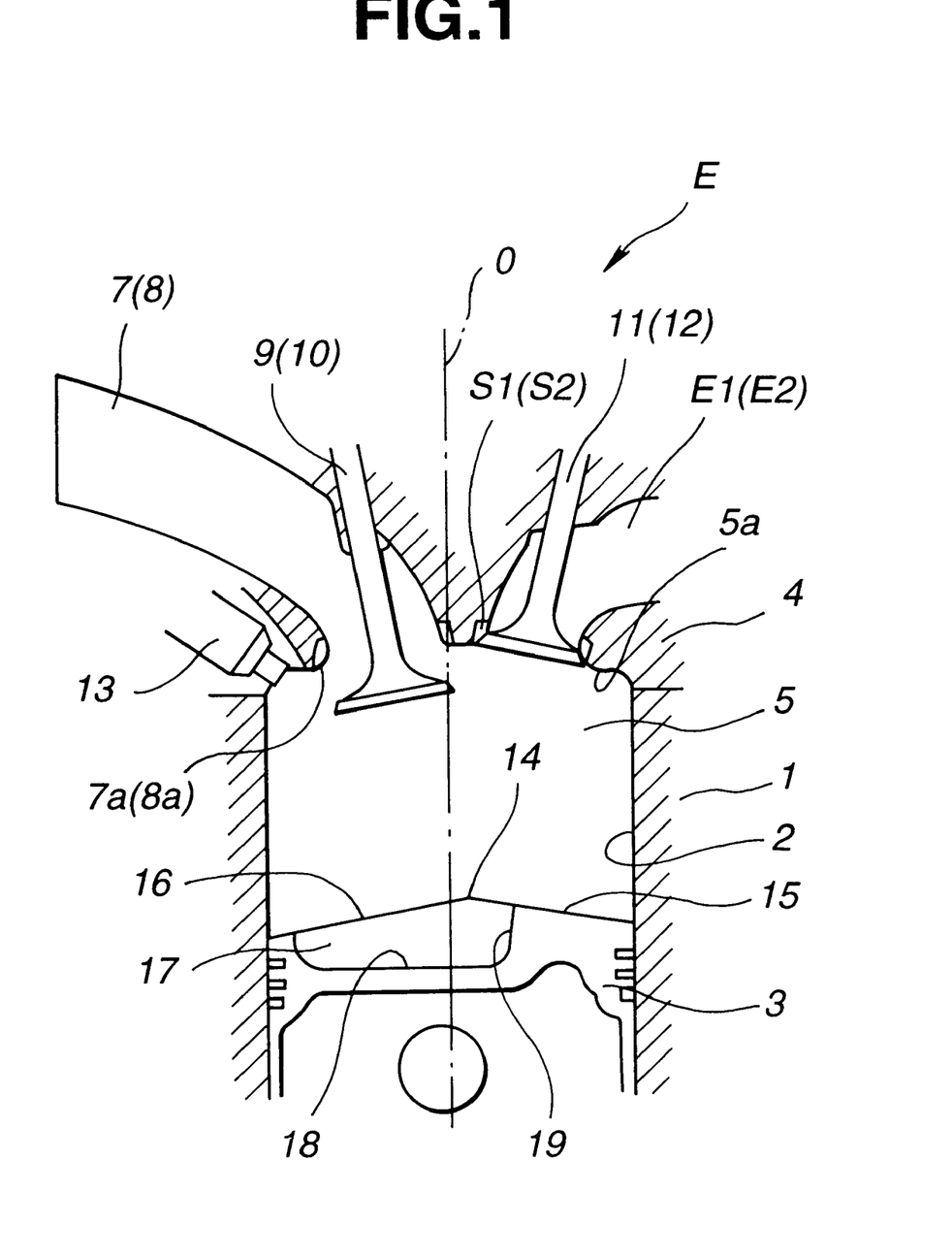
FIG. 1 is a fragmentary schematic vertical sectional view of an embodiment of a cylinder direct injection spark-ignition internal combustion engine according to the present invention.
Figure 2:
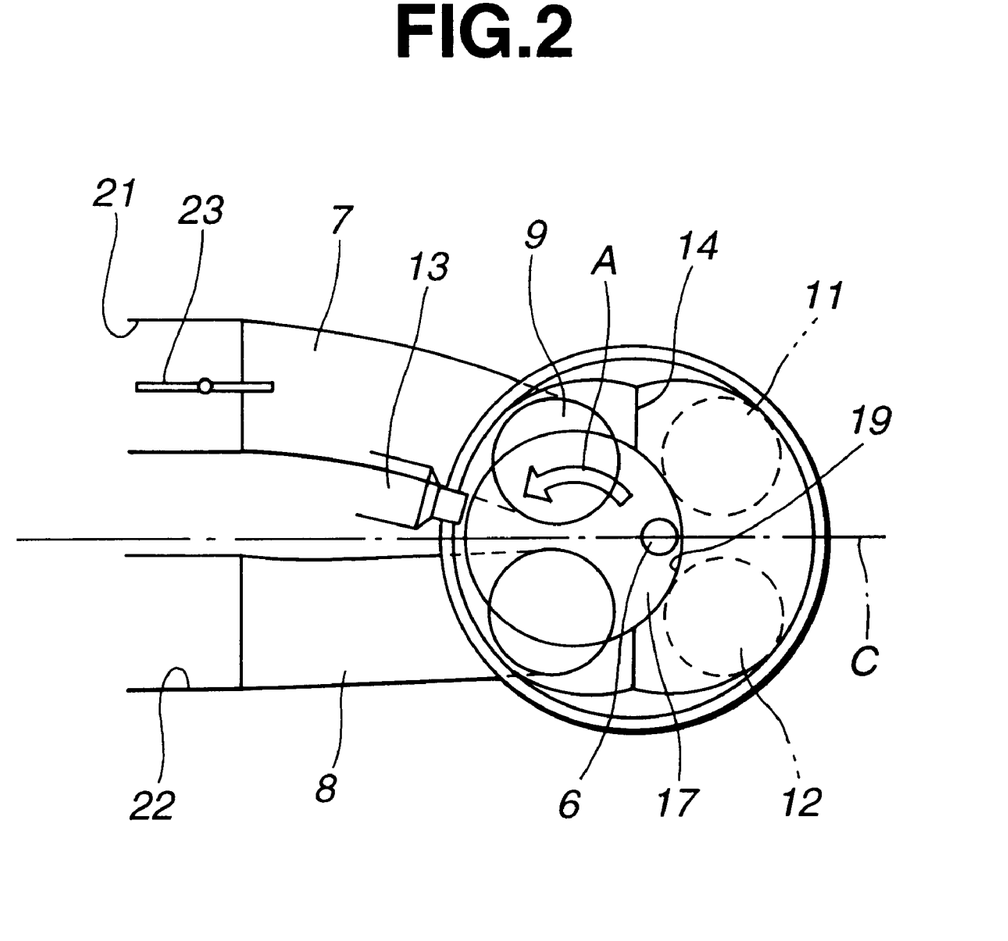
FIG. 2 is a fragmentary schematic plan view of the engine of FIG. 1.
Figure 3:
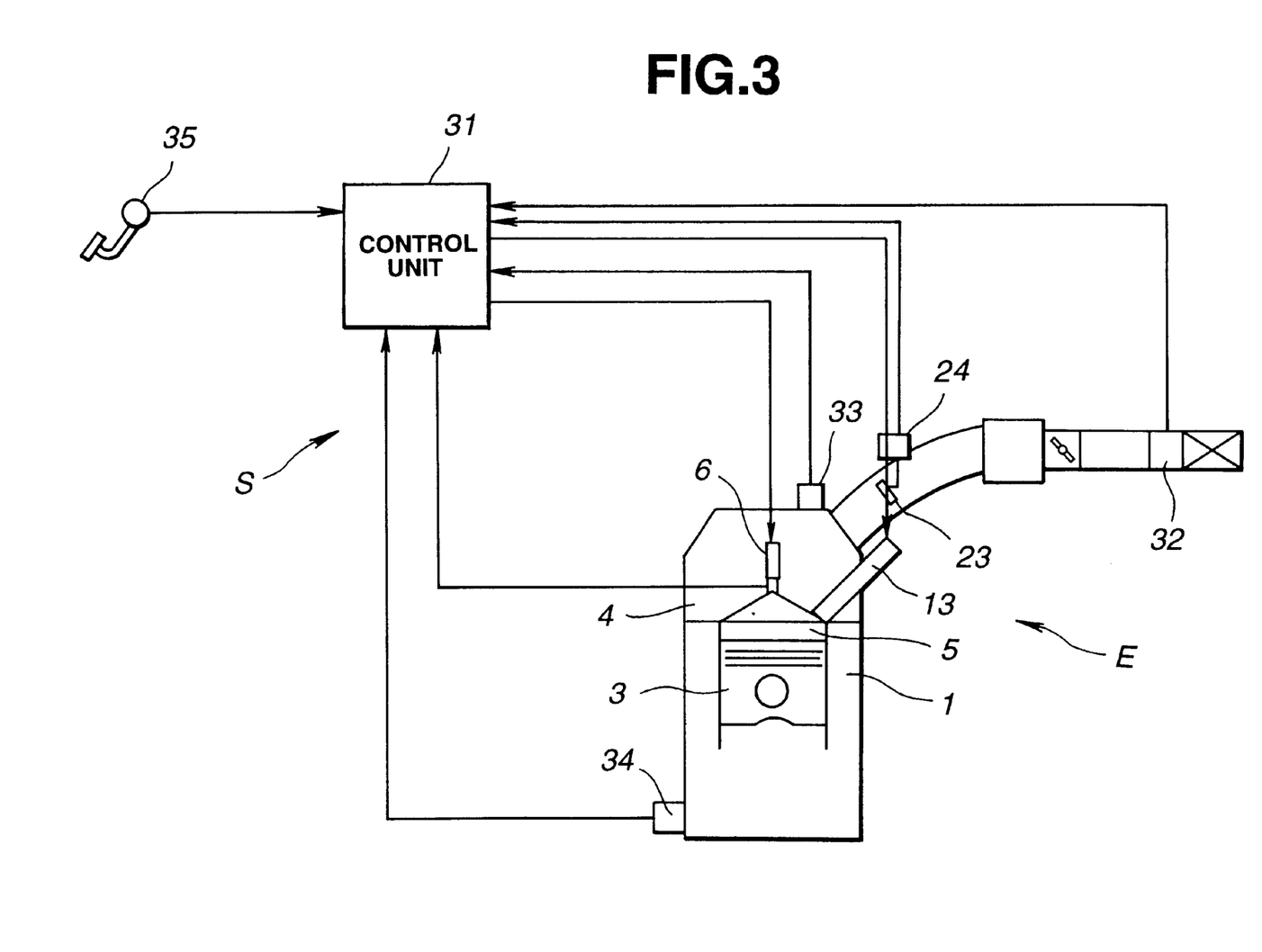
FIG. 3 is a schematic illustration of the engine of FIG. 1, incorporated with a control system for the engine.

Referring now to FIGS. 1, 2 and 3, an embodiment of a cylinder direct injection spark-ignition internal combustion engine according to the present invention is illustrated by the reference character E. The engine E of this embodiment is for an automotive vehicle and comprises a cylinder block 1 in which a plurality of engine cylinders 2 are formed though only one engine cylinder 2 is shown. A piston 3 is movably disposed in each cylinder. A cylinder head 4 is fixed to the top surface of the cylinder block 1. A pentrooftype combustion chamber 5 is formed between the piston 3 and the cylinder head 4.

Two intake ports 7, 8 and two exhaust ports E1 and E2 are formed in the cylinder head 4. The intake ports 7, 8 are largely inclined relative to a vertical plane (not shown) containing the axes O of the cylinders 2 in order to prevent the an intake manifold (not shown) to be installed from being located at a high position relative to the engine E. The intake port 7, 8 open to the combustion chamber 5 respectively through valve seats 7a, 8a. Intake valves 9, 10 are movably disposed to be seatable respectively on the valve seats 7a, 8a. Similarly, exhaust ports E1, E2 open to the combustion chamber 5 respectively through valve seats S1, S2. Exhaust valves 11, 12 are movably disposed to be seatable respectively on the valve seats S1, S2.

A spark plug 6 and a fuel injector 13 are disposed in the cylinder head 4 so as to project into the combustion chamber 5. The spark plug 6 is located such that its axis is slightly separate from the axis O of the cylinder 2. The tip end section of the fuel injector 13 is located near the periphery of the combustion chamber 5 as shown in FIG. 1 and positioned between the two intake valves 9, 10 as viewed from the upper side as shown in FIG. 2.

As illustrated in FIG. 1, the piston 3 has its roof-type top surface including inclined surfaces 15, 16 which are contiguous through a ridgeline 14. A generally dish-shaped circular cavity 17 is formed at the top surface of the piston 3 so as to be eccentric to the side of the fuel injector 13 relative to the axis O of the cylinder 2 as viewed from the upper side. More specifically, the cavity 17 has a flat bottom wall surface 18 which is perpendicular to the axis O of the cylinder 2. A generally annular side wall surface 19 extends upward from the periphery of the bottom surface 18 and reaches the top surface of the piston 3. The diameter of the side wall surface 19 increases in a direction toward the top surface of the piston 3. Thus, the cavity 17 is defined by the bottom wall surface 18 and the side wall surface 19. The side wall surface 19 has a predetermined inclination angle relative to the vertical plane containing the axes O of the cylinders 2, on another vertical plane C (in FIG. 2) perpendicular to the above-mentioned vertical plane (containing the axes O) as illustrated in FIG. 1. Additionally, the cavity 17 is formed in a manner to cut out a central section of the ridgeline 14 between the inclined surfaces 15, 16 of the top surface of the piston 3 so that sprayed fuel from the fuel injector 13 can be gathered around the spark plug 6 in an engine operating region where stratified charge combustion is carried out.

The shape of the piston 3 and the combustion chamber 5 is symmetrical with respect to the vertical plane C including the axes O of the cylinders as shown in FIG. 2. Similarly, the intake ports 7, 8 are formed generally symmetrical with respect to the vertical plane C, in which the intake port 7 has a larger inclination angle relative to the vertical plane C than that of the intake port 8 as viewed from the upper side as illustrated in FIG. 2. Accordingly, intake air is distributed equally into the intake ports 7, 8 and then flows into the cylinder 2 to form intake air stream. The intake air stream descends through an inclined wall surface 5a forming part of the ceiling wall of the combustion chamber 5 and through an inner wall surface of the cylinder 2 contiguous with the inclined wall surface 5a, thereby generating so-called tumble stream which turns in the cylinder 2.

The fuel injector 13 has an axis which can be directed into the cavity 17 and is inclined downward so as to prevent fuel injected or sprayed from the fuel injector 13 from directly striking against the spark plug 6 as shown in FIG. 1. The fuel injected from the fuel injector 13 takes a spray cone whose spray angle is set at a value within a predetermined range at which almost whole the sprayed fuel is within the cavity 17 when fuel is injected upon opening of the fuel injector 13 at the latter half period of compression stroke (where the piston 3 ascends) in the engine operating region where stratified charge combustion is carried out. In an engine operating range where homogeneous charge combustion is carried out, fuel injection from the fuel injector 13 is made on intake stroke (where the piston 3 descends). Thus, fuel injection timings (at which the fuel injector 13 injects fuel) of the engine E is controlled in accordance with combustion conditions such as stratified charge combustion and homogeneous charge combustion.

As shown in FIG. 3, a control unit or controller 31 forming part of a control system S is provided to control the fuel injection timings in accordance with the combustion conditions, and to control a spark timing (at which the spark plug 6 makes its spark) and a fuel injection quantity (at which fuel is injected from the fuel injector 13). The control unit 31 is supplied with an intake air quantity signal (from an airflow meter 32) representative of quantity of intake air to be supplied to the engine E, a coolant temperature signal (from a coolant temperature sensor 33) representative of temperature of engine coolant, an engine speed signal (from a crank angle sensor 34) representative of engine speed of the engine E, and an accelerator position signal (from an accelerator position sensor 35) representative of an operation amount of an accelerator. The control unit 31 is configured to judge as to which combustion condition (i.e., the engine operating region) is required for the current engine operation, in accordance with the intake air quantity signal, the coolant temperature signal, the engine speed signal and the accelerator position signal. The control unit 31 is further configured to calculate the fuel injection quantity and the spark timing corresponding to the judged combustion condition, and output control signals representative of the fuel injection quantity and the spark timing to the fuel injector 13 and the spark plug 6.

Figure 4:
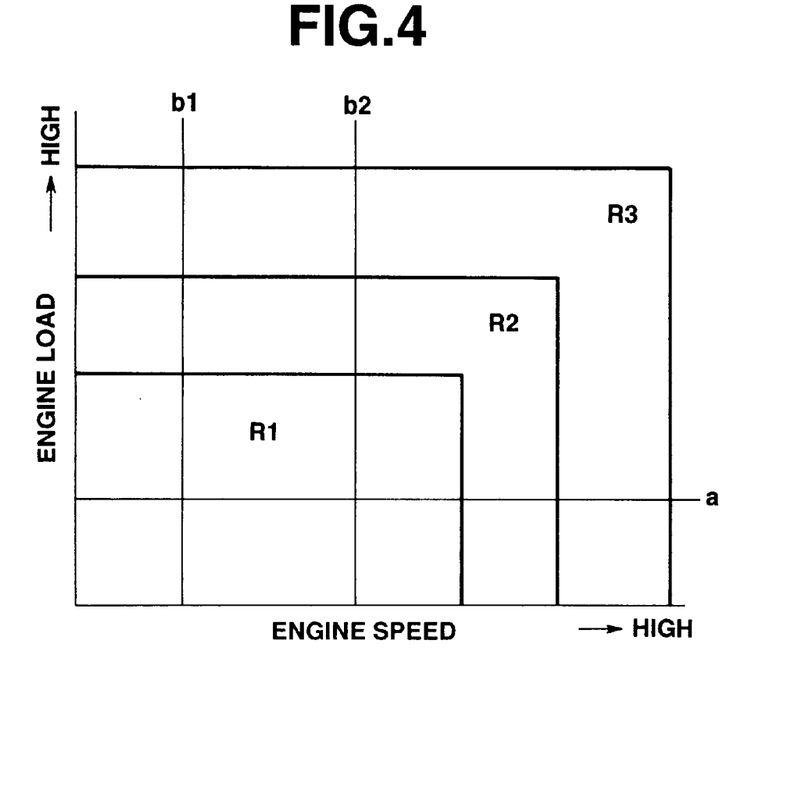
FIG. 4 is a graphical representation showing a plurality of engine operating regions in which predetermined combustion conditions are respectively made in a cylinder.

Here, in this embodiment, the engine operating regions for the respective combustion conditions are set as shown in FIG. 4. Each engine operating region is set and detected in accordance with engine speed detected by the crank angle sensor 34 and engine load determined by the intake air quantity detected by the airflow meter 32, the accelerator operation amount detected by the accelerator position sensor 35 and/or the like. The stratified charge combustion or engine operating region R1 (where stratified charge combustion is carried out) lies within a low and medium engine speed range extending from a low engine speed to a medium engine speed of the engine and lines within a low and medium engine load range extending from a low engine load to a medium engine load of the engine. This is because turbulence of air in the cylinder becomes severe at a high engine speed range under the effect of a large amount of intake air, and therefore combustible air-fuel mixture cannot be gathered around the spark plug 6 so as to deteriorate combustion if fuel is injected on compression stroke under engine operation in the high engine speed range. In other words, homogeneous charge combustion in which fuel injection is made on intake stroke is suitable for the engine operation in the high engine speed range, so that the stratified charge combustion region is limited to the low and medium speed range.

A homogeneous charge combustion or engine operating region R2, R3 (where stratified charge combustion is carried out) lies within a medium and high engine speed range and within a medium and high engine load range as shown in FIG. 4. In homogeneous charge combustion, fuel injected on intake stroke is uniformly mixed with air in the cylinder and thereafter combusted. The homogeneous charge combustion region R2, R3 includes a lean homogeneous charge combustion or engine operating region R2 in which engine operation is made in a lean air-fuel ratio range between air-fuel ratios 20:1 and 25:1, and a stoichiometric homogeneous charge combustion or engine operating region R3 in which engine operation is made in stoichiometric air-fuel ratio range around stoichiometric air-fuel ratio. Fuel economy has preference over engine power output in the lean homogeneous charge combustion region, whereas engine power output has preference over fuel economy in the stoichiometric homogeneous charge combustion region. More specifically, the stoichiometric homogeneous charge combustion region R3 includes a high power output homogeneous charge combustion region which resides around the maximum engine speed of the engine. In this high power output homogeneous charge combustion region, engine operation is made at an air-fuel ratio richer than stoichiometric air-fuel ratio.

As shown in FIG. 2, a swirl control valve 23 of the butterfly valve type is rotatably disposed in a branch runner 21 of an intake manifold, connected to the intake port 7. Another branch runner 22 of the intake manifold is connected to the intake port 8. The swirl control valve 23 is driven by an actuator 24 constituted of a step motor, shown in FIG. 3. As the opening degree of the swirl control valve 23 is decreased to narrow a flow passage area of the branch runner 21, the rate of the quantity of intake air flowing through the branch runner 22 to the cylinder 2 increases relative to the rate of the quantity of intake air flowing through the branch runner 21 into the cylinder 2, thereby generating swirl of air-fuel mixture in the cylinder 2 as indicated by an arrow A in FIG. 2. Accordingly, turning streams generated in the cylinder 2 include swirl (component) which turns around the axis of the cylinder 5, and tumble (component) which turns around an axis (not shown) perpendicular to the axis O of the cylinder 2. Particularly in the stratified charge combustion region, a swirl ratio is set preferably at a value within a range of from 1.5 to 3.0, or a value not less than about 3. The swirl ratio is set preferably at a value not less than 1.5 times of a tumble ratio. The swirl ratio is the number of rotations of the swirl during a time period in which a crankshaft of the engine E makes its one rotation. The tumble ratio is the number of rotations of the tumble during a time period in which the crankshaft makes its one rotation.

Now, it is assumed that if the intensity of the swirl is changed in the stratified charge combustion region, the combustion condition will change so as to largely affect driveability of the engine. Consequently, it is preferable to gradually change the intensity of the swirl in order to omit a changeover shock made during changeover of the combustion conditions. In this regard, in conventional cylinder direct injection spark-ignition internal combustion engines, the intensity of the swirl is changed in accordance with engine load, and therefore change in intensity of swirl (i.e., change in combustion condition) is frequent and abrupt when abrupt acceleration and deceleration are repeated during stratified charge combustion, thereby degrading driveability of the engine. Additionally, in case that such conventional engines have the stratified charge combustion region (R1), the lean homogeneous charge combustion region (R2) and the stoichiometric homogeneous charge combustion region (R3) (including the high power output homogeneous charge combustion region) as shown in FIG. 4, the intensity of the swirl is to be controlled as follows: In a process that engine operation is changed over from the stratified charge combustion region (R1) through the lean homogeneous charge combustion region (R2) to the stoichiometric homogeneous charge combustion region (R3), the intensity of the swirl is gradually decreased in the stratified charge combustion region (R1), immediately increased in the lean homogeneous charge combustion region (R2), and again decreased in the stoichiometric homogeneous charge combustion region (R3). Thus, the intensity of the swirl is largely changed whenever changeover of the combustion conditions is made. Even in a process that engine operation is changed over from the stratified charge combustion region (R1) through the stoichiometric homogeneous charge combustion region (R3) to the lean homogeneous charge combustion region (R2) along with change in engine load, the intensity of the swirl is largely changed thereby degrading the driveability of the engine if the intensity of the swirl is changed in accordance with the engine load.

Figure 5:
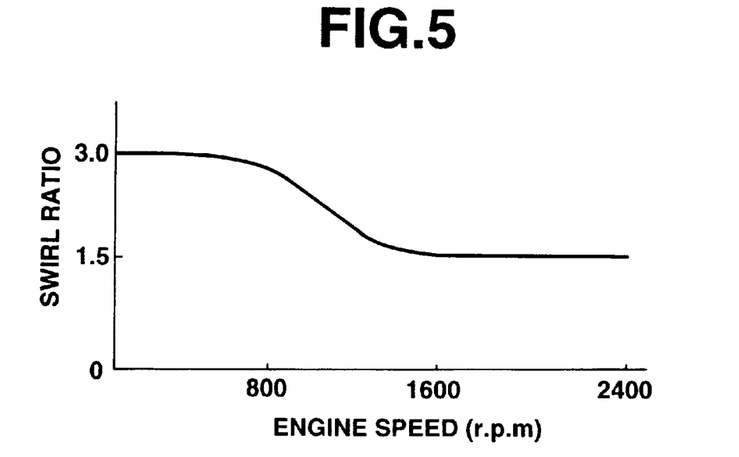
FIG. 5 is a graph showing the characteristics of the swirl ratio in terms of engine speed, in a stratified charge combustion region, in connection with the engine of FIG. 1.

In order to cope with the above problems, with the engine E of the above-discussed embodiment according to the present invention, the intensity of the swirl is controlled to be changeable in accordance with engine speed of the engine E which engine speed is not changed abruptly. More specifically, the opening degree of the swirl control valve 23 is controlled in such a manner as to increase the intensity of the swirl in a low engine speed range and to decrease the intensity of the swirl as the engine speed increases in the stratified charge combustion region R1 as shown in FIG. 5. Besides, in a process that engine operation shifts from the stratified charge combustion region R1 through the lean homogeneous charge combustion region R2 to the stoichiometric homogeneous charge combustion region R3 along with an increase in engine speed, change in intensity of the swirl among the different combustion regions is accomplished in accordance with engine speed of the engine E.

Discussion will be made on the reason why the intensity of the swirl is increased in the low engine speed range and decreased as engine speed increases.

Figure 6:
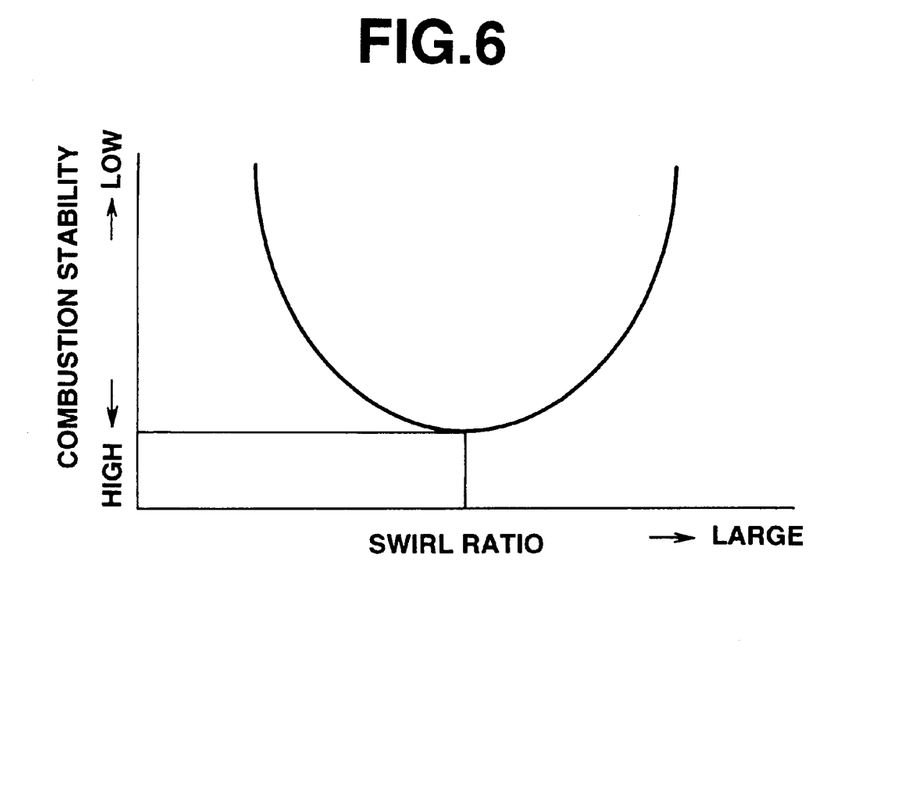
FIG. 6 is a graph showing the characteristics of the combustion stability in the cylinder in terms of the swirl ratio, in a low engine speed range in the stratified charge combustion region, in connection with the engine of FIG. 1.
Figure 7:
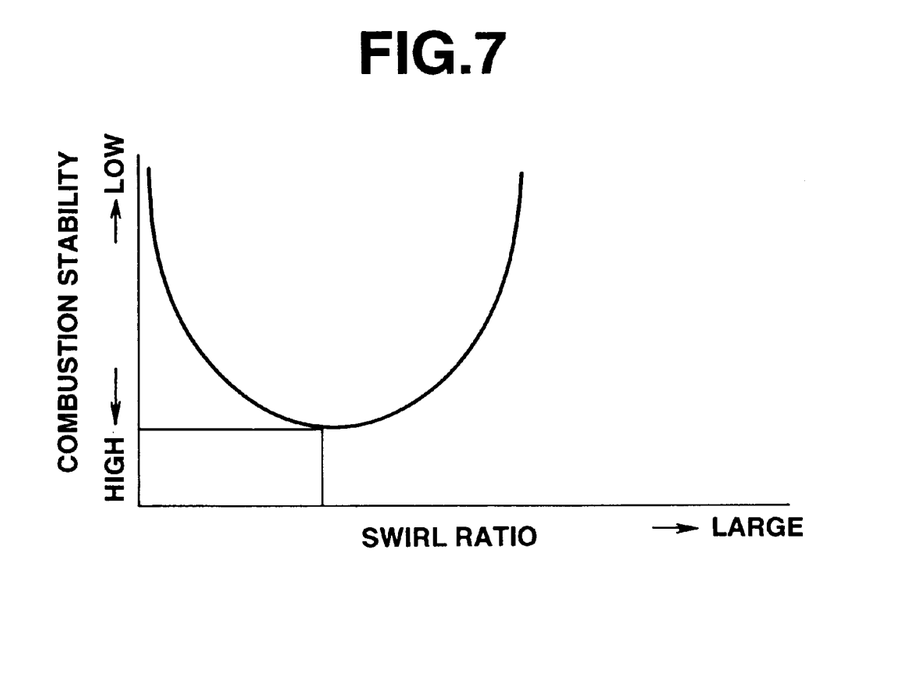
FIG. 7 is a graph similar to FIG. 6 but showing the characteristics of the combustion stability in terms of the swirl ratio, in a medium engine speed range in the stratified charge combustion region, in connection with the engine of FIG. 1.

During stratified charge combustion, relatively rich air-fuel mixture is gathered around the spark plug 6 and combusted. In the low engine speed range during the stratified charge combustion, the intensity of swirl is weak and therefore a relatively long time is taken before the air-fuel mixture reaches the spark plug 6 so that no stable combustion can be obtained. Consequently, in the low engine speed range, the intensity of swirl is increased in order to well mix injected fuel with air and to smoothly transport air-fuel mixture to a position around the spark plug 6. Besides, the intensity of swirl increases with an increase in engine speed. In this regard, if the same intensity as that at the low engine speed range is provided in a medium engine speed range, the swirl intensity is too high so as to make excessive mixing between fuel and air, thereby causing air-fuel mixture around the spark plug 6 becomes excessively lean. This cannot provide stable combustion of air-fuel mixture in the cylinder. Hence, the intensity of swirl is decreased in the medium engine speed range. Here, the relationship between combustion stability (in the cylinder) and the intensity (i.e., the swirl ratio) of swirl is shown in FIG. 6 (in the low engine speed range during stratified charge combustion) and FIG. 7 (in the medium engine speed range during stratified charge combustion), in which the optimum swirl ratio is determined in accordance with engine speed. This prevents the swirl ratio from being unnecessarily increased at the low engine speed range, and prevents the swirl ratio form being unnecessarily decreased in the medium engine speed range, so that the characteristics of the swirl ratio is obtained as a curve having a certain width throughout the whole engine speeds in the stratified charge combustion region, as illustrated in FIG. 5.

Figure 8:
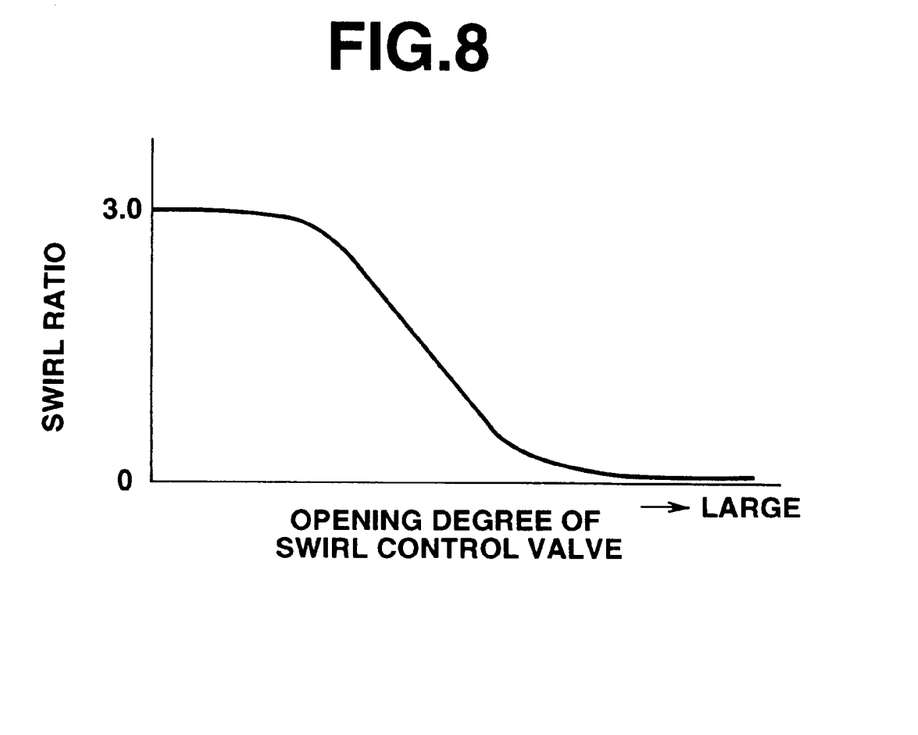
FIG. 8 is a graph showing the characteristics of the swirl ratio in terms of the opening degree of a swirl control valve used in the engine of FIG. 1.
Figure 9:
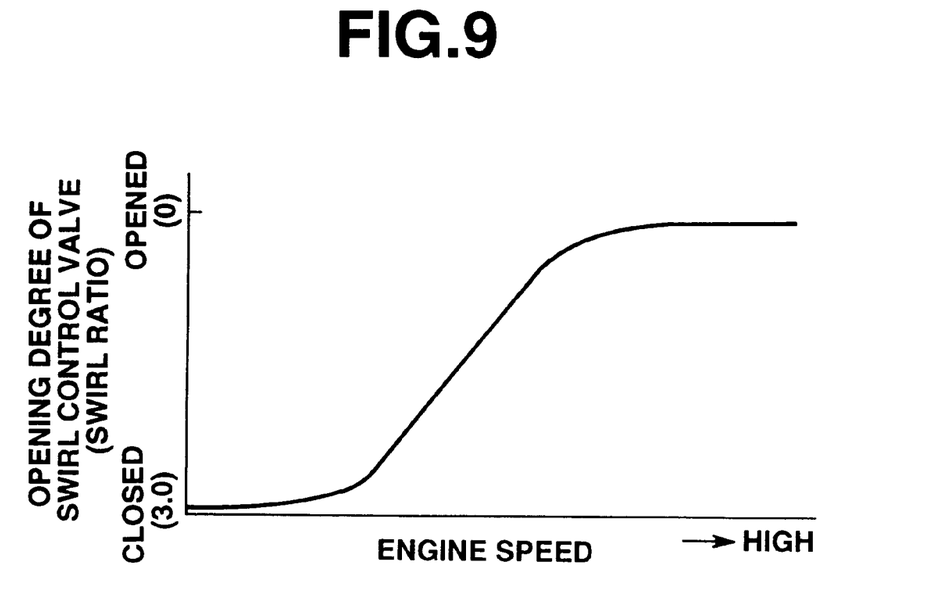
FIG. 9 is a graph showing the characteristics of the opening degree of the swirl control valve in terms of the engine speed, in connection with the engine of FIG. 1.

Here, the relationship between the swirl ratio and the opening degree of the swirl control valve 23 is shown in FIG. 8. If the characteristics of FIG. 5 is converted into the relationship between the engine speed and the opening degree of the swirl control valve by using the relationship of FIG. 8, a characteristics of FIG. 9 is obtained.

When engine operation has come to the stratified charge combustion region, the control unit 31 operates as follows: Searching is made on a table corresponding to FIG. 9 in accordance with the engine speed thereby to determine the opening degree (a target opening degree) of the swirl control valve 23, and then the actuator 24 is driven so that the swirl control valve 23 takes this opening degree.

When engine operation is changed over from the stratified charge combustion region R1 to the lean homogeneous charge combustion region R2 along with rise in engine speed in connection with FIG. 4, the control unit 31 operates as follows: The swirl control valve 23 is controlled to take its minimum opening degree (at which the valve 23 is in a generally fully closed state) thereby increasing the intensity of swirl. Then, when engine operation shits to the stoichiometric homogeneous charge combustion region (including the high power output homogeneous charge combustion region) upon a further rise in engine speed, the control unit 31 operates to put the swirl control valve 23 into its fully opened state so as to remove swirl in the cylinder.

Here, function of the engine E of the above embodiment will be discussed.

Figure 10:
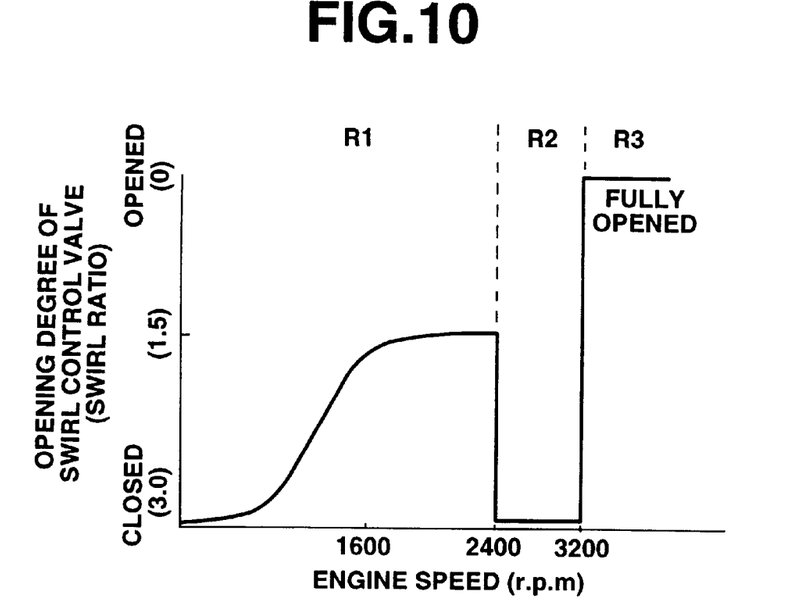
FIG. 10 is a graph of the characteristics of the opening degree of the swirl control valve in terms of the engine speed, in connection with the engine of FIG. 1.

If the engine operation proceeds along a line a in FIG. 4, the opening degree of the swirl control valve 23 takes a characteristics shown in FIG. 10, in terms of the engine speed and the opening degree of the swirl control valve 23. This characteristics depicts that the opening degree of the swirl control valve 23 is smaller in the low engine speed range and is increased with rise of engine speed.

Figure 11:
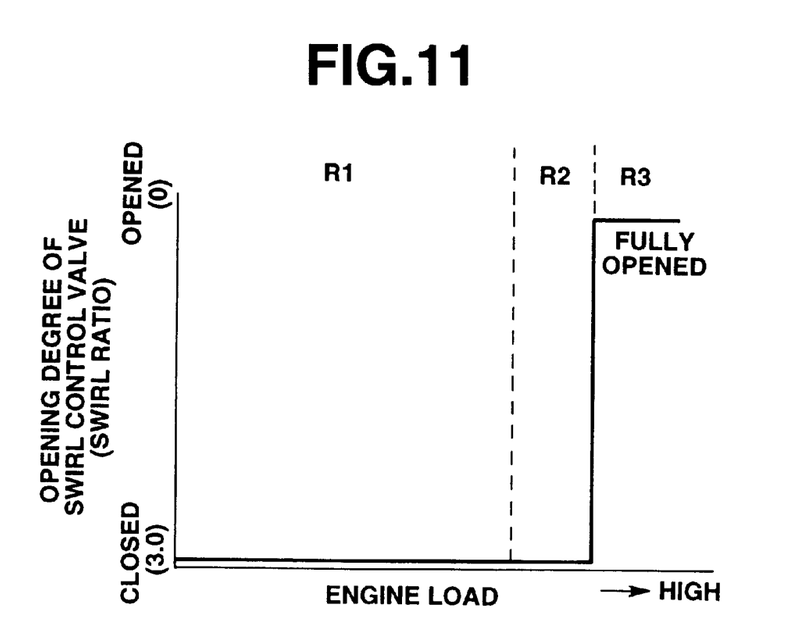
FIG. 11 is a graph showing the first characteristics of the opening degree of the swirl control valve in terms of the engine load, in connection with the engine of FIG. 1.
Figure 12:
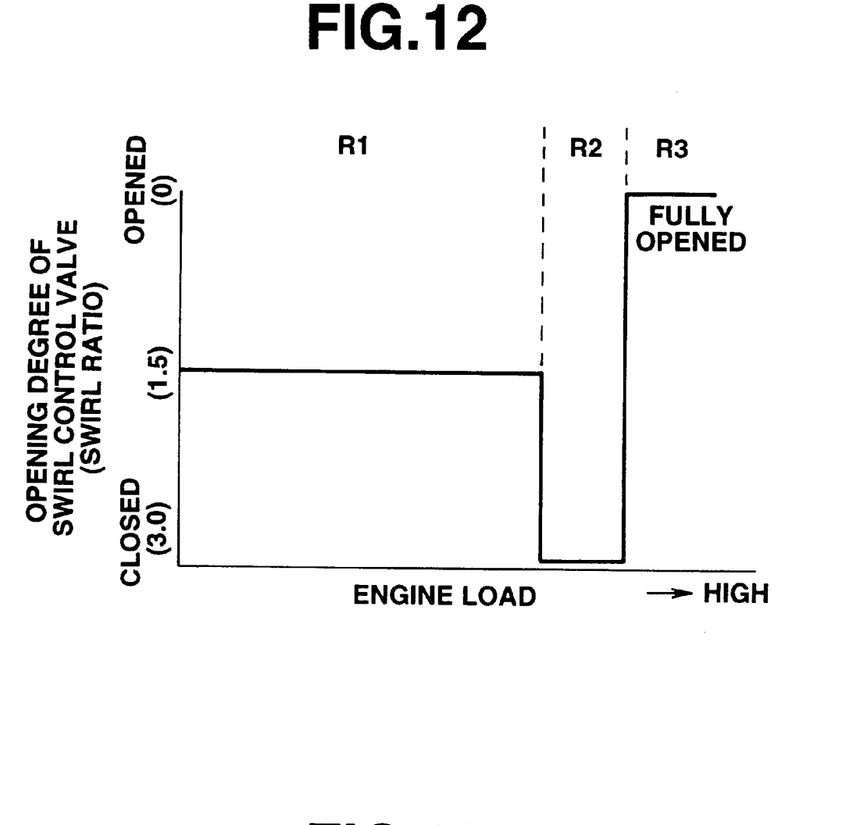
FIG. 12 is a graph similar to FIG. 11 but showing the second characteristics of the opening degree of the swirl control valve in terms of the engine load, in connection with the engine of FIG. 1.

In contrast, if engine operation proceeds along a line b 1 in FIG. 4, engine speed does not change and therefore the swirl control valve 23 is fixed at a generally fully closed state in the stratified charge combustion region as shown in FIG. 11. If the engine operation proceeds along a line b2 in FIG. 4, the opening degree of the swirl control valve 23 is fixed at a predetermined value as shown in FIG. 12 even though the engine speed is constant.

Thus, according to the engine of the above embodiment, in the stratified charge combustion region, the opening degree of the swirl control valve 23 is controlled in accordance with engine speed which cannot make its abrupt change, without being controlled in accordance with engine load which makes abrupt change. As a result, combustion condition in the cylinder can be prevented from its abrupt change even though abrupt acceleration and deceleration are repeatedly made in the stratified charge combustion region, thereby suppressing influence on driveability of the engine to a small level.

Besides, in the stratified charge combustion region, the intensity of swirl is increased in the low engine speed range and decreased as engine speed rises. Consequently, combustion in the stratified charge combustion region can be always stable, and therefore good driveability of the engine can be maintained under stable combustion even under abrupt acceleration and deceleration made in the stratified charge combustion region.

When engine operation is changed over from the stratified charge combustion region through the lean homogeneous charge combustion region to the stoichiometric homogeneous charge combustion region (including the high power output homogeneous charge combustion region) under the constant engine load, the swirl control valve 23 is changed to its generally fully closed state in the lean homogeneous charge combustion region and to its generally fully opened state in the stoichiometric homogeneous charge combustion region (including the high power output homogeneous charge combustion region) as illustrated in FIG. 10.

As discussed above, according to the present invention, changeover in intensity of swirl in the cylinder is accomplished in accordance with engine speed, among the combustion regions which are largely different in combustion condition, when engine operation is changed over among the combustion regions along with a change in engine speed. As a result, combustion condition in the cylinder can be prevented from being abruptly changed even when the combustion regions having the respective combustion conditions are changed over with a change in engine speed.

Figure 13:
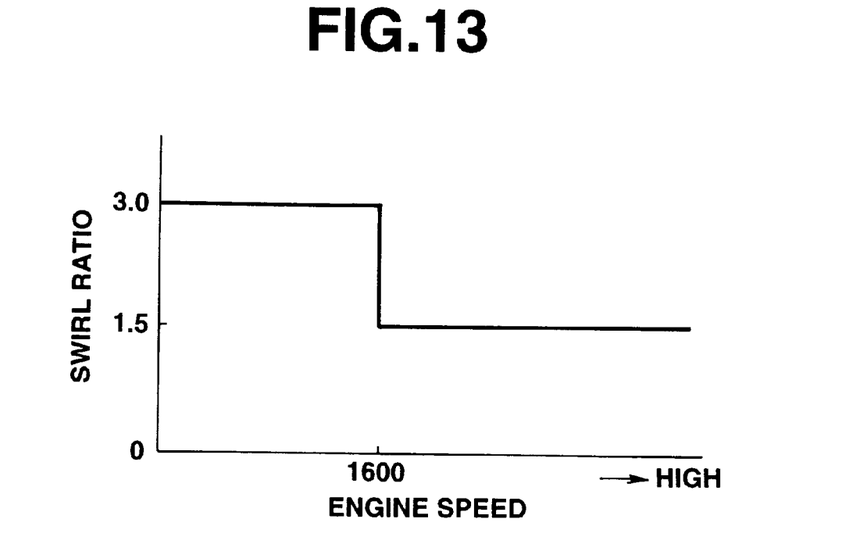
FIG. 13 is a graph similar to FIG. 5 but showing the characteristics of the swirl ratio in terms of engine speed, in a stratified charge combustion region, in connection with another embodiment of the cylinder direct injection spark-ignition internal combustion engine in accordance with the present invention.
Figure 14:
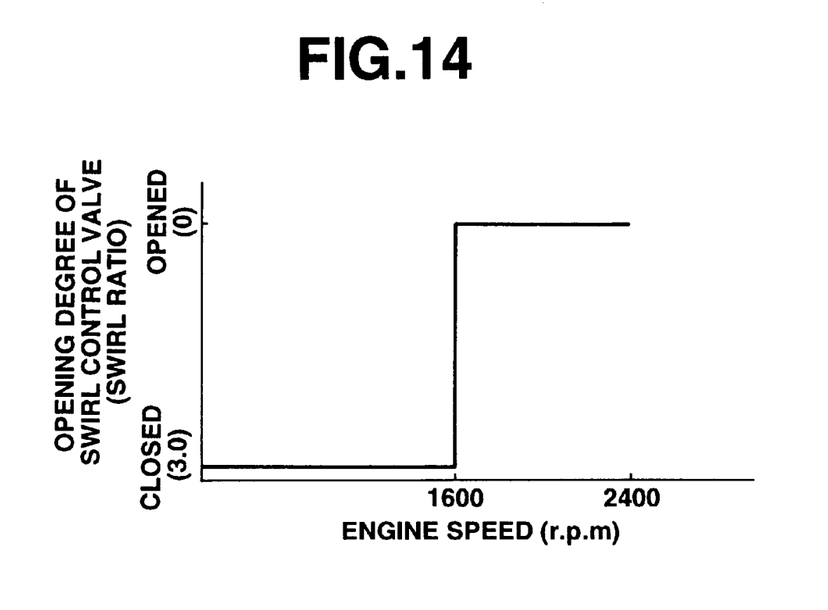
FIG. 14 is a graph showing the characteristics of the opening degree of the swirl control valve in terms of the engine speed, in connection with the engine of FIG. 13.
Figure 15:
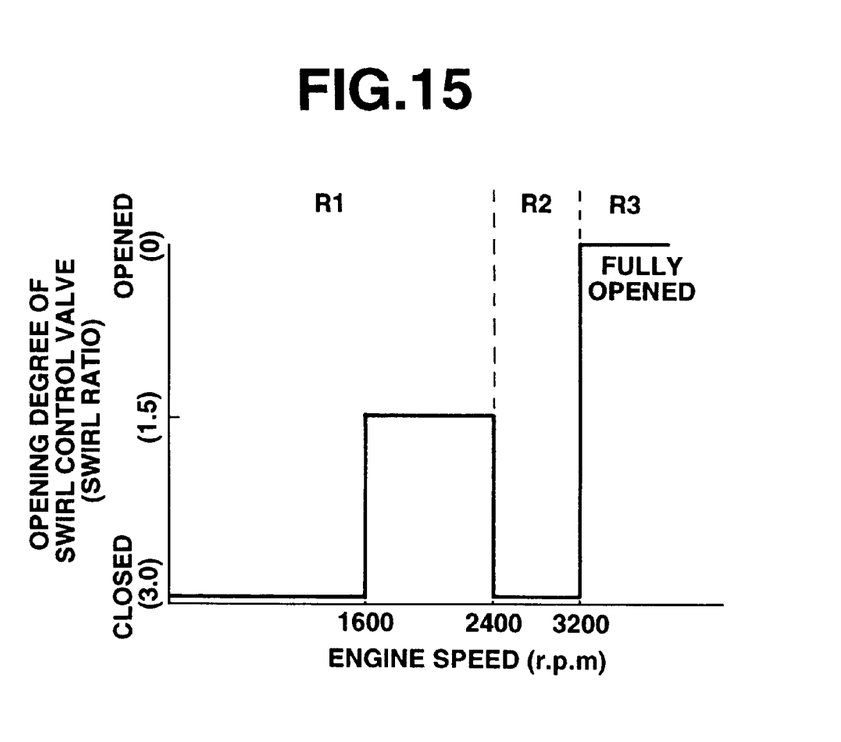
FIG. 15 is a graph showing the characteristics of the opening degree of the swirl control valve in terms of the engine speed, in connection with the engine of FIG. 13.

FIGS. 13, 14 and 15 illustrate another embodiment of the engine according to the present invention, similar to the engine of the above embodiment. It will be understood that FIGS. 13, 14 and 15 correspond respectively to FIGS. 5, 9 and 10 for the above embodiment. This embodiment is configured to stepwise change the intensity of swirl in the cylinder in a two-stage manner in which the intensity of swirl is divided into a first stage for the low engine speed range and a second stage for the other engine speed ranges. With this embodiment, driving manner for the actuator 24 is simplified thereby making it possible to accurately control the actuator 24 without using a precise step motor, thus realizing a low-cost control system for the engine.

What is claimed is:

1. A cylinder direct injection spark-ignition engine comprising:
    a section for controlling an intensity of swirl to be formed in a cylinder of the engine;
    a section for detecting a stratified charge combustion region in accordance with an engine operating condition; and
    a section for regulating said swirl intensity controlling section so as to change the intensity of swirl in accordance with an engine speed of the engine, in said stratified charge combustion region detected by said detecting section.

2. A cylinder direct injection spark-ignition engine as claimed in claim 1, wherein said regulating section includes a section for decreasing the intensity of swirl as the engine speed increases so that the intensity is stronger in a low engine speed range than that in a high engine speed range, in said stratified charge combustion region.

3. A cylinder direct injection spark-ignition engine as claimed in claim 1, wherein said regulating section includes a section for defining first and second predetermined intensities of swirl to be formed in the cylinder, said first predetermined intensity being for a low engine speed range in said stratified charge combustion region, said second predetermined intensity being for the other engine speed ranges in said stratified charge combustion region.

4. A cylinder direct injection spark-ignition engine as claimed in claim 2, further comprising a section for increasing the intensity of swirl in response to a changeover made from said stratified charge combustion region to a lean homogeneous charge combustion region.

5. A cylinder direct injection spark-ignition engine as claimed in claim 4, further comprising a section for decreasing the intensity of swirl in response to a changeover made from said lean homogeneous charge combustion region to a stoichiometric homogeneous charge combustion region.

6. A cylinder direct injection spark-ignition engine as claimed in claim 4, further comprising a section for decreasing the intensity of swirl in response to a changeover made from said lean homogeneous charge combustion region to a high power output homogeneous charge combustion region.

7. A cylinder direct injection spark-ignition engine as claimed in claim 6, wherein said swirl intensity decreasing section includes a section for preventing formation of swirl in the cylinder in response to the changeover made from said lean homogeneous charge combustion region to the high power output homogeneous charge combustion region.

8. A cylinder direct injection spark-ignition engine as claimed in claim 1, further comprising a section for increasing the intensity of swirl in response to a changeover made from said stratified charge combustion region to a lean homogeneous charge combustion region which is higher in engine speed than said stratified charge combustion region; and a section for decreasing the intensity of swirl in response to a changeover made from said lean homogeneous charge combustion region to a stoichiometric homogeneous charge combustion region which is higher in engine speed than said lean homogeneous charge combustion region.

9. A cylinder direct injection spark-ignition engine as claimed in claim 8, wherein said swirl intensity decreasing section includes a section for preventing formation of swirl in the cylinder in response to the changeover made from said lean homogeneous charge combustion region to said stoichiometric homogeneous charge combustion region.

10. A cylinder direct injection spark-ignition engine as claimed in claim 1, further comprising a section for increasing the intensity of swirl in response to a changeover made from said stratified charge combustion region to a lean homogeneous charge combustion region which is higher in said stratified charge combustion region; and a section for decreasing the intensity of swirl in response to a changeover made from said lean homogeneous charge combustion region to a high power output homogeneous charge combustion region.

11. A cylinder direct injection spark-ignition engine as claimed in claim 10, wherein said swirl intensity decreasing section includes a section for preventing formation of swirl in the cylinder in response to the changeover made from said lean homogeneous charge combustion region to said high power output homogeneous charge combustion region.

12. A cylinder direct injection spark-ignition engine comprising:
    a swirl control valve movably disposed in a passage connected to a cylinder of the engine, said swirl control valve regulating a swirl ratio in the cylinder;
    a sensor for detecting an engine operating condition representative of a stratified charge combustion region; and
    a controller for controlling said swirl control valve so as to change the swirl ratio in accordance an engine speed of the engine, in said stratified charge combustion region detected by said sensor.

* * * * *